Oct. 29, 1946.    H. M. GODSEY    2,410,209
COMBINED WHEEL RIM AND PNEUMATIC TIRE
Original Filed Sept. 15, 1941
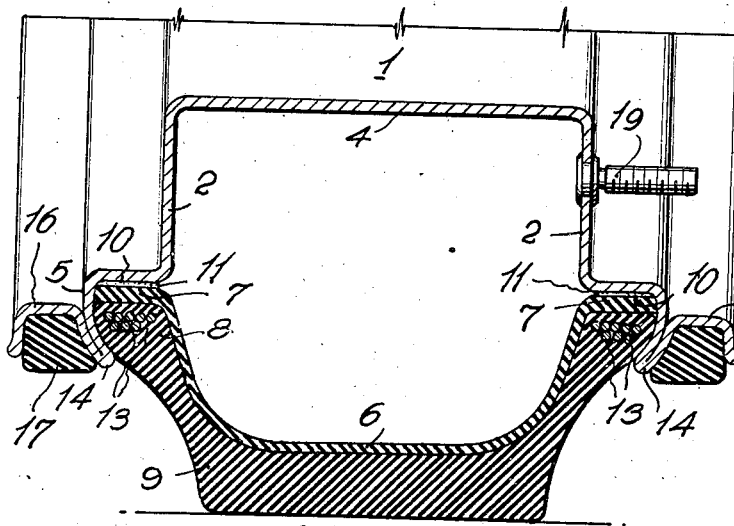
Fig. 1
Fig. 2
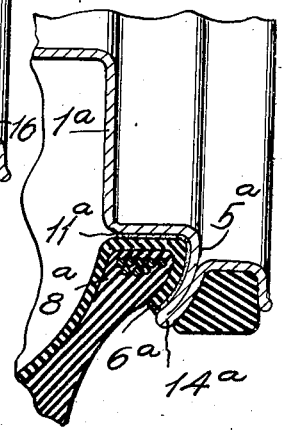
Fig. 3
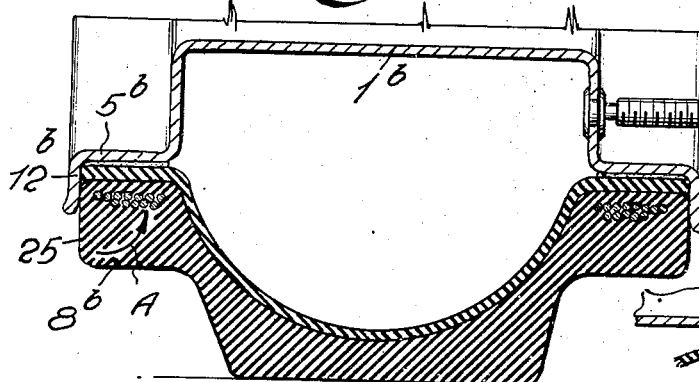
Fig. 5
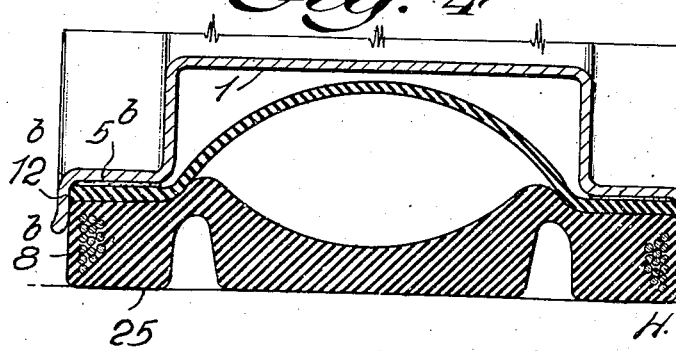
Fig. 4
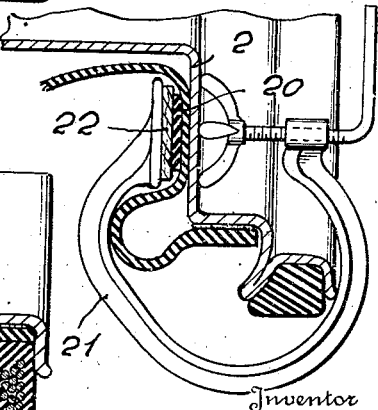
Inventor
H. Mitchell Godsey,
By Sommers & Young
Attorneys Patented Oct. 29, 1946

2,410,209

UNITED STATES PATENT OFFICE 2,410,209

COMBINED WHEEL RIM AND PNEUMATIC TIRE

H. Mitchell Godsey, Crockett, Tex.

Original application September 15, 1941, Serial No. 410,932. Divided and this application May 1, 1945, Serial No. 591,339

4 Claims. (Cl. 152—330)

This application is a division of my application Serial No. 410,932 for "Combined wheel rim and pneumatic tire," filed September 15, 1941.

This invention relates to resilient tires and wheels and has for an object to provide a combination of the wheel rim and an elastic tread in such manner that the wheel rim, which is preferably of the "drop center" type, constitutes part of the means for enveloping the compressed air which supports the tire tread.

A further object of this invention is to eliminate the use of the conventional annular inner tube by substituting a band of elastic material such as rubber or the like, which will be connected at its edges to the wheel rim in air-tight manner, whereby said band and the wheel rim together serve as a substitute for the conventional inner tube.

A still further object of this invention is to provide for supplementing the adhesion of the inner strip to the wheel rim by pressure exerted by the tire casing, this constituting a pressure sealing means.

Another object of this invention is to provide a combination of a wheel rim inner strip and outer tire casing in which the shape of the rim and tire beading is such as to provide an elastic emergency supporting surface in case of deflation of the tire.

Still another object of the invention is to provide a wheel rim of such shape that when a flat strip and outer casing are applied in position the air will press the edge of the inner strip between the bead of the casing and a surface of the wheel rim flange and thereby supplement the adhesion of the inner strip to the wheel rim flange.

A still further object of the invention is to provide a resilient wheel and tire employing a flat strip in place of a conventional inner tube and in which the wheel rim has supplementary means of support in case of deflation of the tire, so as to enable the wheel to continue in use at reduced speed without injury to the tire casing or inner strip.

In the accompanying drawing several embodiments of the invention are shown in cross section.

Fig. 1 is a cross sectional view of a first embodiment of a wheel rim and tire assembly according to the invention.

Fig. 2 is a view similar to Fig. 1 of a second embodiment.

Fig. 3 is a view similar to Figs. 1 and 2 of a third embodiment, and Fig. 4 is a view similar to Fig. 3 of the same embodiment with the tire deflated.

Fig. 5 is a partial sectional view of the embodiment shown in Fig. 1 with the outer casing removed and a device for repairing a puncture in the inner strip applied, and illustrating the advantage of a rectangular form of rim.

In the embodiment illustrated in Fig. 1 of the drawing, reference numeral 1 indicates the rim of a wheel formed of metal or the like and being generally in the form of a deep channel, in cross section, of the type generally known as a "drop center" rim. Preferably the side walls 2 are flat and may join the bottom plate 4 at a sharp angle which may be approximately a right angle. At their outer edges, the side walls 2 of the rim are curved so as to form grooves 5 in which the edges 7 of the inner band 6 are disposed underneath the beads 8 of the outer casing 9. The grooves 5 are provided with flat surfaces 10 upon which the edge portions 7 of the inner bands 6 are cemented as indicated at 11 by any suitable sealing substance, such as rubber cement. The inner bands 6 are preferably made of a highly elastic substance, such as rubber, and the outer edge portions 7 may be thicker than the middle portion. The circumference of the outer edges is preferably smaller than the circumference of the flat surfaces upon which they bear in use, whereby the elasticity of the material draws the edges of the bands tightly against the said surfaces so as to serve as a sealing means. In addition to the cement and elasticity of the edges of the bands, the bands are held in place by the beading 8 of the tire casing 9 which may be provided with the usual wire cable 13. The shape of the grooves 5 in which the outer casing beads are disposed is such that the outer wall which forms the groove extends slightly inwardly about the outer edge of the beading, thereby tending to hold it in place; and furthermore, under the influence of the lateral pressure exerted by the air in the tire, the beading is pressed under this inwardly extending edge 14 and reacts inwardly to press on the edge portion 7 of the inner band.

At the outer edge of the side wall 12 of one of the grooves, the metal is bent reversely and into the form of a small channel 16, and in this channel a solid rubber emergency tire 17 is disposed for the purpose of giving support to the wheel in case the tire previously described is punctured and deflated.

In one of the walls of the channel forming the main tire rim, a valve 19 is mounted for supplying the air to the tire.

In the embodiment of the invention illustrated in Fig. 2, the construction of the wheel rim 1a is similar to that of the embodiment of Fig. 1, except with respect to the groove 5a in which the edge of the inner band and the outer casing bead are disposed. In this case, the groove may be more rounded; and the edge 7a of the inner band 6a extends around the inner periphery of the groove and about the beading 8a of the casing. The cement 11a is applied throughout the extent of the groove, so that the area of cementation is greater than in Fig. 1. Furthermore, the edge of the inner band extends along the lateral outer edges of the casing beads, so that the outward thrust produced against the beads by the air presses the edges of the inner band firmly against the outer wall of the groove 5a. In this embodiment also, the outer edge 14a of the groove extends inwardly whereby an inward reaction is produced against the tire casing bead which presses it radially inwardly against the portion of the inner band therebeneath similarly as described in connection with Fig. 1.

In the embodiment of the invention illustrated in Figs. 3 and 4, the shape of the rim 1b is substantially similar to that shown in Fig. 1; but in this embodiment the emergency tread 17 and the channel in which it is mounted are omitted. Furthermore, the grooves 5b for the tire beads have flat lateral walls 12b, that is, do not have inwardly turned outer edges. In substitution for the emergency tread 17 of Figs. 1 and 2, in this embodiment the beads 8b of the outer casing are made so wide that when turned through 90° they will extend outwardly beyond the edges of the walls which form grooves 5b in which they are are retained. Therefore, in case of deflation of the tire when the casing is pressed into the channel of the tire rim, the casing walls will exert a turning influence on the beads 8b in the direction of the arrow A, Fig. 3, whereby the beads will rotate through 90° and assume the position illustrated in Fig. 4, in which the beads protrude from the groove and can serve as an emergency tread for giving resilient support during such continuation of the travel after deflation of a tire as may be necessary to bring the vehicle to a stop, or even to drive it further to a service station where the tire can be repaired. It is particularly to be observed that in Fig. 4 the surface 25 of the tire bead which is facing downwardly is the same surface as is facing laterally in Fig. 3, this being a result of the 90° turning of the bead.

In order to repair the inner band, it is not always necessary to remove it from the rim, but as illustrated in Fig. 5 in which an embodiment resembling that of Fig. 1 is shown, the repair can usually be made by removing the outer casing and applying a vulcanizing patch 20 over the puncture by the use of a special clamp 21 which presses the patch against the band and the band against the flat side wall 2 of the rim. A sheet of combustible material 22 is applied over the patch and is ignited to supply the heat necessary for vulcanizing. It will be observed that the flat side walls of the casing are particularly adapted for this repair operation, and it is for this reason that the flat side walls of the rim are preferable to curved side walls.

It will be clear from consideration of the foregoing disclosure that the construction herein provided enables the substitution of a plain circular band of rubber for the ordinary inner tube. This is a very substantial advantage because of the much less quantity of rubber required for the manufacture of such bands, as well as the great simplification of the process of manufacture, these two features taken together allowing sale of such bands at only a small fraction of the usual price of an ordinary inner tube.

I claim:

1. A vehicle tire structure comprising a drop center wheel rim having a bottom and two outwardly extending flanges forming a recess, the outer edges of said flanges being formed as grooves, said grooves having outwardly facing surfaces, a separate band of rubber extending across the open side of said recess and having its edges seated on said outwardly facing surfaces, the edge portions of said band being thicker than the center portion and of smaller circumference than said outwardly facing surfaces on which they are seated, so as to elastically press on said surfaces and aid in the sealing, and an outer casing covering said band.

2. A vehicle tire structure comprising a drop center wheel rim having a bottom and two outwardly extending flanges forming a recess, the outer edges of said flanges being formed as grooves, said grooves having outwardly facing surfaces, a separate band of rubber extending across the open side of said recess and having its edges seated on said outwardly facing surfaces, the edge portions of said band being of smaller circumference than said outwardly facing surfaces on which they are seated, so as to elastically press on said outwardly facing surfaces and aid in the sealing, and an outer casing covering said band.

3. A vehicle tire structure comprising a drop center wheel rim having a bottom and two outwardly extending flanges forming a recess, the outer edges of said flanges being formed as grooves, said grooves having cylindrical outwardly facing surfaces, a separate band of rubber extending across the open side of said recess and having its edges seated and cemented on said cylindrical surfaces, the edge portions of said band being thicker than the center portion and of smaller circumference than the cylindrical surfaces on which they are seated, so as to elastically press on said cylindrical surfaces and aid in the sealing, the outer wall of said grooves being slightly inturned toward their outer edges, an outer casing covering said band and having beads along its edges lying in said grooves over the edges of said band and engaging the inturned edge portions of the outer walls of said grooves whereby lateral pressure exerted on said casing beads by the air in said tire reacts against said inturned edges to press the casing edges inwardly against the edges of the band in said grooves, and an air valve in said rim for inflating the tire.

4. A vehicle tire structure comprising a drop center wheel rim having a bottom and two outwardly extending flanges forming a recess, the outer edges of said flanges being formed as grooves, said grooves having cylindrical outwardly facing surfaces, a separate band of rubber extending across the open side of said recess and having its edges seated and cemented on said cylindrical surfaces, the edge portions of said band being thicker than the center portion and of smaller circumference than the cylindrical surfaces on which they are seated, so as to elastically press on said cylindrical surfaces and aid in the sealing, and an outer casing covering said band and having beads along its edges lying in said grooves over the edges of said band and bearing against said edges of the band to assist in holding the edges seated on the cylindrical surfaces in the grooves.

H. MITCHELL GODSEY.